(12) United States Patent
Takeuchi et al.

(10) Patent No.: US 10,251,070 B2
(45) Date of Patent: Apr. 2, 2019

(54) RECEIVED INTENSITY CALCULATION DEVICE, RECEIVED INTENSITY CALCULATION METHOD, AND STORAGE MEDIUM USING THEORETICAL VALUES AND MEASURED VALUES

(71) Applicant: JVC KENWOOD Corporation, Yokohama-shi, Kanagawa (JP)

(72) Inventors: Sunao Takeuchi, Yokohama (JP); Ichiro Shishido, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 103 days.

(21) Appl. No.: 15/426,472

(22) Filed: Feb. 7, 2017

(65) Prior Publication Data
US 2017/0150372 A1 May 25, 2017

Related U.S. Application Data

(63) Continuation of application No. PCT/JP2015/062988, filed on Apr. 30, 2015.

(30) Foreign Application Priority Data

Aug. 8, 2014 (JP) .................... 2014-162721
Aug. 8, 2014 (JP) .................... 2014-162722

(51) Int. Cl.
    *H04W 16/18* (2009.01)
    *H04B 17/318* (2015.01)
    *H04B 17/21* (2015.01)

(52) U.S. Cl.
    CPC ........... *H04W 16/18* (2013.01); *H04B 17/21* (2015.01); *H04B 17/318* (2015.01)

(58) Field of Classification Search
None
See application file for complete search history.

(56) References Cited

U.S. PATENT DOCUMENTS 9,372,523 B2 * 6/2016 Furukawa ........... G06F 11/3409
2005/0272373 A1 * 12/2005 Murase ................ H04B 1/7115
455/67.11
(Continued)

FOREIGN PATENT DOCUMENTS

JP 2011-019109 A 1/2011
WO 2010-067560 A1 6/2010

*Primary Examiner* — Eunsook Choi
(74) *Attorney, Agent, or Firm* — Brundidge & Stanger, P.C.

(57) ABSTRACT

A first acquisition unit acquires theoretical values of received intensity of radio waves from a transmission point received at a plurality of reception points. A second acquisition unit defines a reception point associated with one of a plurality of theoretical values of received intensity acquired by the first acquisition unit as a measurement point and acquires a measured value of received intensity at the measurement point thus defined. A determination unit that determines a correction range in accordance with a difference between the measured value of received intensity acquired by the second acquisition unit and the theoretical value of received intensity at the measurement point acquired by the first acquisition unit. A correction unit corrects the theoretical value of received intensity at the reception point included in the correction range determined by the determination unit, based on the measured value of received intensity acquired by the second acquisition unit.

13 Claims, 16 Drawing Sheets

(56) References Cited

U.S. PATENT DOCUMENTS

| | | | |
|---|---|---|---|
| 2007/0093212 A1* | 4/2007 | Sugahara | H04B 17/3912 455/67.16 |
| 2007/0149126 A1* | 6/2007 | Rangan | H04W 24/10 455/63.1 |
| 2010/0081390 A1* | 4/2010 | Motoyoshi | H04B 17/3912 455/67.11 |
| 2011/0287778 A1* | 11/2011 | Levin | G01S 5/0252 455/456.1 |
| 2012/0027068 A1* | 2/2012 | Motoyoshi | H04W 16/18 375/224 |

* cited by examiner

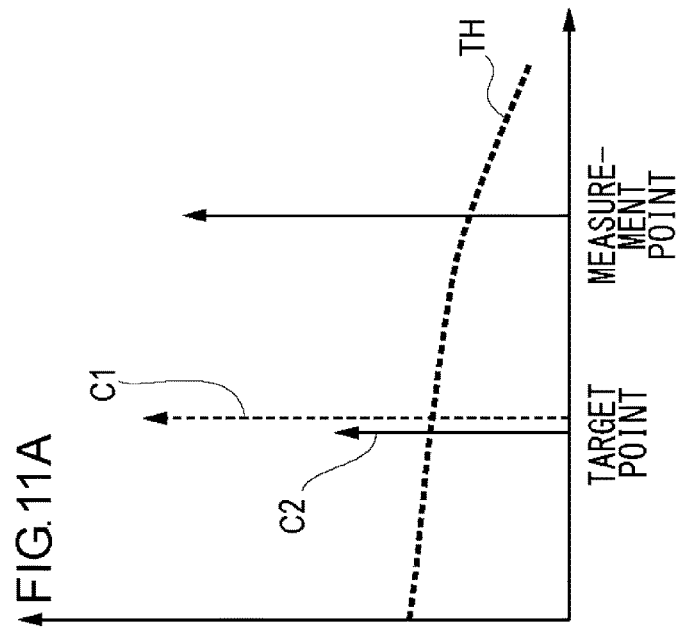
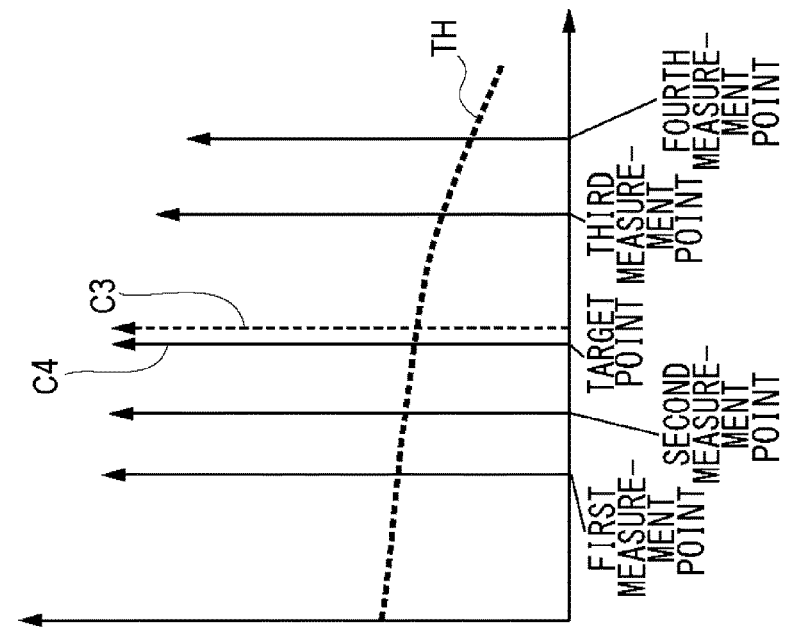
FIG.11A
FIG.11B

RECEIVED INTENSITY CALCULATION DEVICE, RECEIVED INTENSITY CALCULATION METHOD, AND STORAGE MEDIUM USING THEORETICAL VALUES AND MEASURED VALUES

CROSS-REFERENCE TO RELATED APPLICATION

This application is based upon and claims the benefit of priority from the Japanese Patent Application No. 2014-162721, filed on Aug. 8, 2014 and Japanese Patent Application No. 2014-162722, filed on Aug. 8, 2014, the entire contents of which are incorporated herein by reference.

BACKGROUND

1. Field

The present invention relates to received intensity acquisition technologies and, more particularly, to a received intensity calculation device, a received intensity calculation method, and a storage medium using theoretical values and measured values.

2. Description of the Related Art

In cell phone systems and business wireless systems, it is requested that a condition of reception of radio waves originated from base station devices are displayed area by area in a manner easy to understand. For example, the radio wave condition at a given point is learned at a point different from the given point by collecting the radio field intensity, position information, time, etc. from terminal devices and superimposing the collected information on map information. In this process, theoretical values of radio wave propagation are corrected by measured values. Further, correction is made such that the smaller the distance from a measurement point, the closer the corrected value is to the measured value, and, the larger the distance from a measurement point, the closer the corrected value is to the theoretical value (see, for example, patent document 1).

[patent document 1] Pamphlet of WO10/067560

A map created to show a condition of reception of radio waves allows a user to learn the condition of radio waves at a given point intuitively. However, the precision of a map depends on the number of points where measured values are acquired. A large number of measurement points are required in order to create a highly precise map. Further, some measured values are obtained with high measurement precision but others are not so that the precision of a map varies depending on the measurement precision of measured values.

SUMMARY

To address the aforementioned issue, the received intensity calculation device according to one embodiment comprises: a first acquisition unit that acquires theoretical values of received intensity of radio waves from a transmission point received at a plurality of reception points; a second acquisition unit that defines a reception point associated with one of a plurality of theoretical values of received intensity acquired by the first acquisition unit as a measurement point and acquires a measured value of received intensity at the measurement point thus defined; a determination unit that determines a correction range in accordance with a difference between the measured value of received intensity acquired by the second acquisition unit and the theoretical value of received intensity at the measurement point acquired by the first acquisition unit; and a correction unit that corrects the theoretical value of received intensity at the reception point included in the correction range determined by the determination unit, based on the measured value of received intensity acquired by the second acquisition unit.

Another embodiment relates to a received intensity calculation method. The method comprises: acquiring theoretical values of received intensity of radio waves from a transmission point received at a plurality of reception points; defining a reception point associated with one of a plurality of theoretical values of received intensity acquired as a measurement point and acquiring a measured value of received intensity at the measurement point thus defined; determining a correction range in accordance with a difference between the measured value of received intensity acquired and the theoretical value of received intensity at the measurement point acquired; and correcting the theoretical value of received intensity at the reception point included in the correction range determined, based on the measured value of received intensity acquired.

Still another embodiment also relates to a received intensity calculation device. The device comprises: a measured value acquisition unit that acquires measured values of received intensity of radio waves from a transmission point received at a plurality of measurement points; a theoretical value acquisition unit that acquires theoretical values of received intensity at reception points respectively corresponding to a plurality of measured values of received intensity acquired by the measured value acquisition unit; a derivation unit that derives for each measurement point a difference between the measured value of received intensity and the theoretical value of received intensity, based on the plurality of measured values of received intensity acquired by the measured value acquisition unit and a plurality of theoretical values of received intensity acquired by the theoretical value acquisition unit; a target point theoretical value acquisition unit that acquires a theoretical value of received intensity at a reception point for which a received intensity is calculated; and a correction unit that corrects the theoretical value of received intensity acquired by the target point theoretical value acquisition unit, based on differences at respective measurement points derived by the derivation unit.

Yet another embodiment also relates to a received intensity calculation method. The method comprises: acquiring theoretical values of received intensity of radio waves from a transmission point received at a plurality of measurement points; acquiring theoretical values of received intensity at reception points respectively corresponding to a plurality of measured values of received intensity acquired; deriving for each measurement point a difference between the measured value of received intensity and the theoretical value of received intensity, based on the plurality of measured values of received intensity acquired and a plurality of theoretical values of received intensity acquired; acquiring a theoretical value of received intensity at a reception point for which a received intensity is calculated; and correcting the theoretical value of received intensity acquired, based on differences at respective measurement points derived.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 11A-11B show corrected values calculated by the correction unit of FIG. 8;

DETAILED DESCRIPTION

Figure 1:
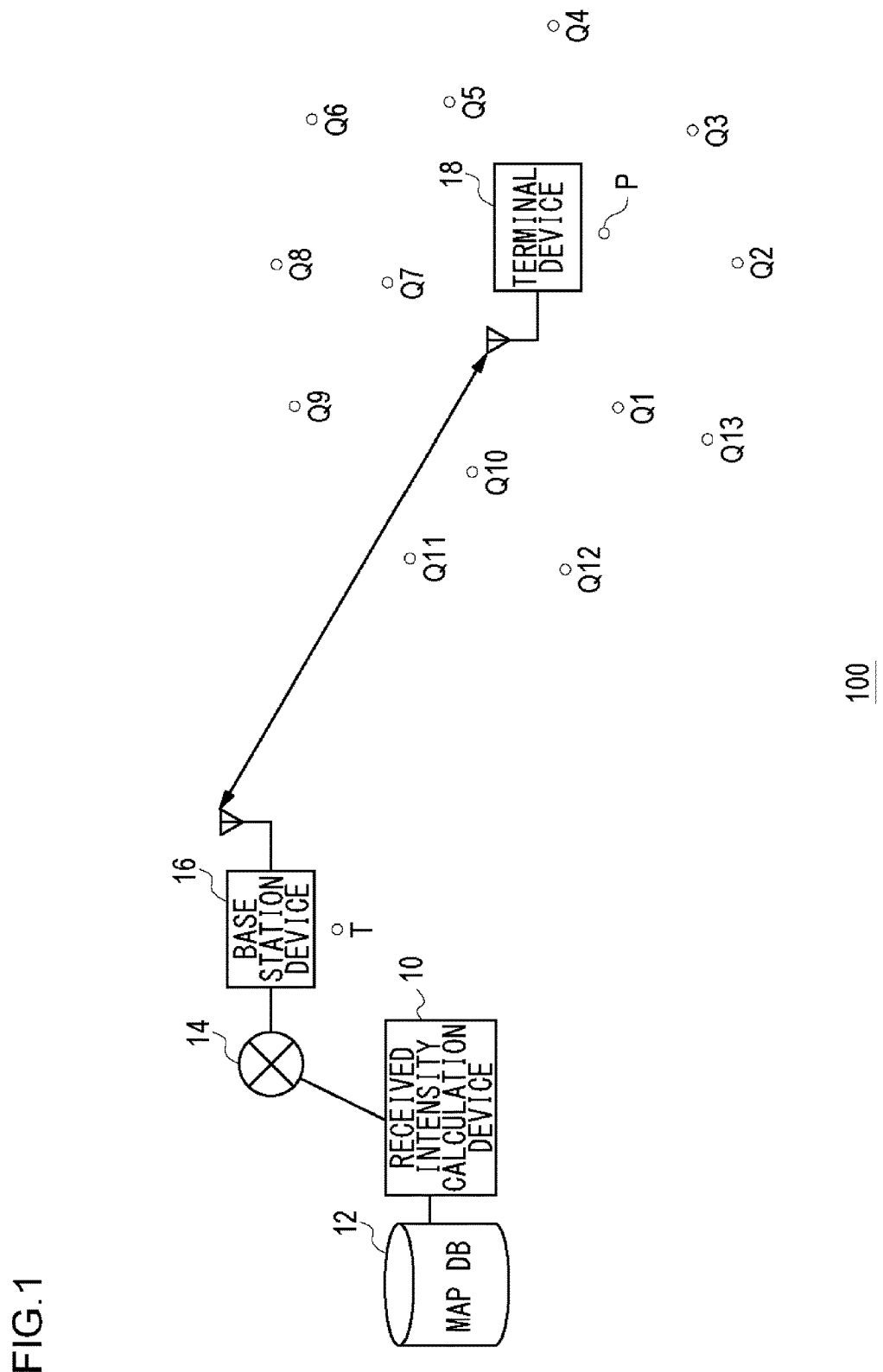
FIG. 1 shows a configuration of a communication system according to Embodiment 1.

The invention will now be described by reference to the preferred embodiments. This does not intend to limit the scope of the present invention, but to exemplify the invention.

(Embodiment 1)

A brief summary will be given before describing the invention in specific details. Embodiment 1 relates to a communication system in which a received intensity calculation device is connected by wire to a base station device connected wirelessly to terminal devices. It is important for a communications carrier to know a condition of radio waves within the coverage. Especially, urban areas are full of obstructions like buildings that shield radio waves. It is therefore desired to allow for their impact on the condition of radio waves beforehand. This is because users of terminal devices are likely to experience lower quality of communication in a weak radio wave environment. Knowing a weak radio wave environment serves to improve the condition of radio waves by, for example, enabling for installing a base station device at a proper location. Further, terminal devices are not only used in urban areas but also in undulating areas like mountainous or country areas remote from a daily living environment.

Meanwhile, models are known whereby the received power (received intensity) of a terminal device is theoretically calculated based on the relative positions of a base station device and a terminal device. An example of such models is the Okumura-Hata model in which distance attenuation, shadowing loss, and diffraction loss are considered. Using a theoretical model like this, it is possible to predict a condition of radio waves in an extensive area with a smaller number of steps and at a smaller cost. However, a theoretical model is at best an approximation of a real world so that the precision of calculation of a condition of radio waves is not necessarily high. Meanwhile, actual measurement of radio wave conditions at different points enables for creating a highly precise radio wave condition map but requires an extremely large number of steps and high cost. This is addressed by the received intensity calculation device according to the embodiment by collecting measured values of radio wave conditions from terminal devices that are actually put into operation and efficiently creating a highly precise radio wave condition map by effectively utilizing theoretical values of received intensity calculated by using a theoretical model and a limited number of measured values.

The received intensity calculation device corrects theoretical values of received intensity such that the smaller the distance from a point where a measured value is obtained, the higher the impact from the measured value, and the larger the distance, the smaller the impact from the measured value. Further, the received intensity calculation device determines an extent of a correction range around a measurement point in which theoretical values should be corrected, based on a difference between the measured value and the theoretical value of received intensity.

FIG. 1 shows a configuration of a communication system 100 according to Embodiment 1. The communication system 100 includes a received intensity calculation device 10, a map DB 12, a network 14, a base station device 16, and a terminal device 18. The network 14, the base station device 16, and the terminal device 18 form a cell phone network or a business wireless system. The publicly known technologies are used for the network 14, the base station device 16, and the terminal device 18 so that a description thereof is omitted. Referring to FIG. 1, the point where the base station device 16 is installed (hereinafter, referred to as "transmission point") is indicated by "T," and the point where the terminal device 18 is located (hereinafter, referred to as "measurement point") is indicated by "P." Radio waves are actually transmitted from the transmission point and actually received at the measurement point. Locations (hereinafter, referred to as "reception points") where the radio waves from the transmission point are estimated to be received are indicated by "Q1" through "Q13." A reception point is also defined at the measurement point (not shown in FIG. 1).

The terminal device 18 measures the intensity of radio waves received at the measurement point and transmits the measured value of received intensity to the base station device 16. The received intensity calculation device 10 is connected to the base station device 16 via the network 14 and acknowledges the measured value of received intensity from the terminal device 18. Meanwhile, the received intensity calculation device 10 calculates theoretical values of intensity of radio waves from the transmission point received at respective reception points. Also, the received intensity calculation device 10 corrects theoretical values at reception points located in the neighborhood of the measurement point, based on the acknowledged measured values. The range of reception points in which the theoretical value is corrected is called "correction range." The received intensity calculation device 10 uses geographical information data acquired from the map DB 12 to create a radio wave condition map by synthesizing the theoretical values at the respective reception points and the corrected theoretical values.

Figure 2:
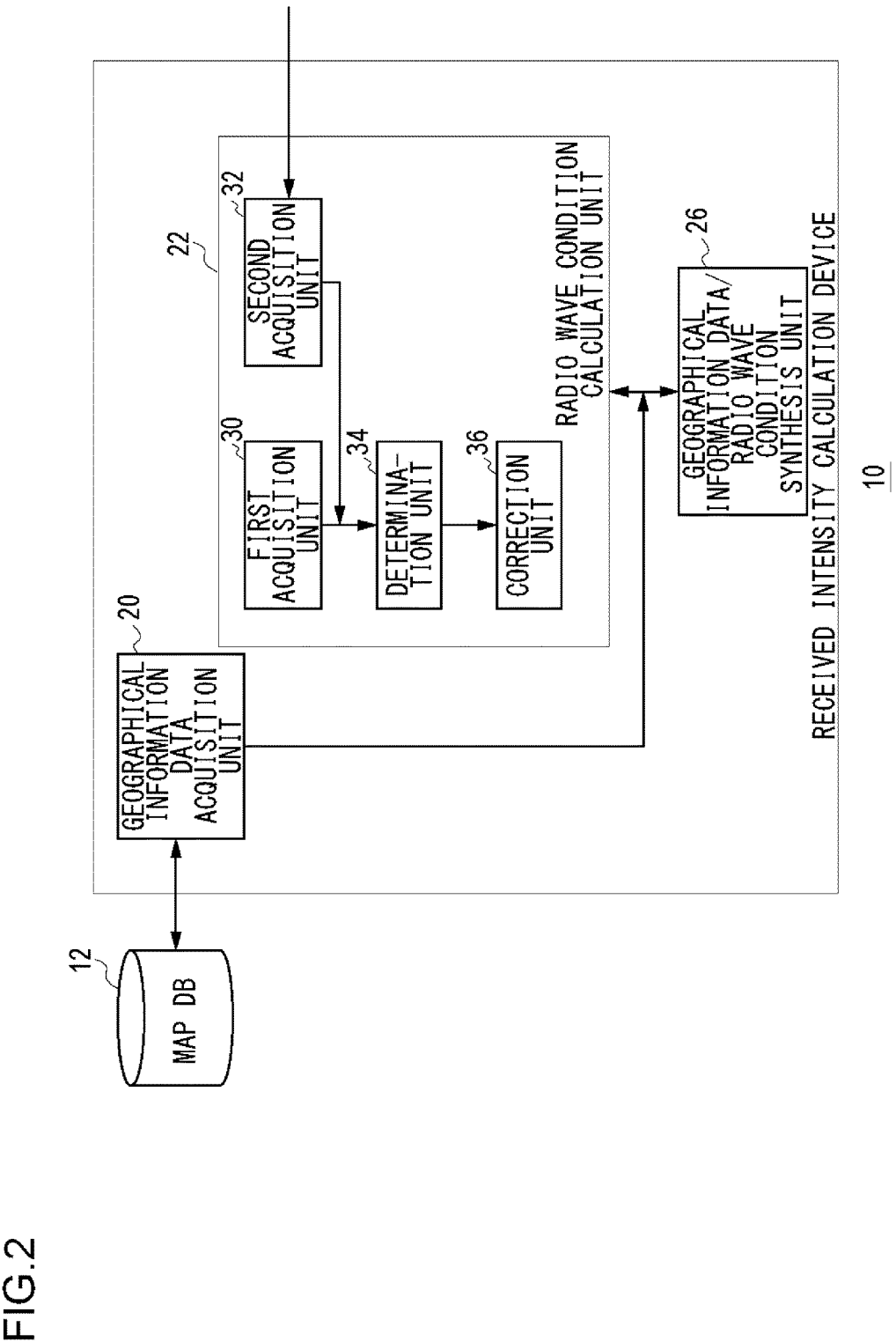
FIG. 2 shows a configuration of the received intensity calculation device of FIG. 1.

FIG. 2 shows a configuration of the received intensity calculation device 10. The received intensity calculation device 10 includes a geographical information data acquisition unit 20, a radio wave condition calculation unit 22, a geographical information data/radio wave condition synthesis unit 26. The radio wave condition calculation unit 22 includes a first acquisition unit 30, a second acquisition unit 32, a determination unit 34, and a correction unit 36.

The geographical information data acquisition unit 20 is connected to the map DB 12 and acquires geographical information data within the coverage from the map DB 12. The geographical information data includes, for each reception point for which the received intensity should be calculated, location information (latitude and longitude) and information on height Hm defined by considering the antenna height of the terminal device 18. For example, reception points may be defined at major roads, buildings, etc. The geographical information data also includes location information (latitude and longitude) on the transmission point and information on antenna height Hb of the terminal device 18.

The first acquisition unit 30 calculates a theoretical value of received intensity pf radio waves transmitted from the transmission point defined in the geographical information data and received at a plurality of reception points. The theoretical value of received intensity at reception point Q1 defined in the geographical information data is indicated by S[Q1]. A similar notation is used in the other reception points. Further, the theoretical value of received intensity at a reception point corresponding to a measurement point P defined in the geographical information data is indicated by S[P]. For example, the Okumura-Hata model is used for calculation of theoretical values of received intensity in the first acquisition unit 30.

The second acquisition unit 32 is connected to the network 14 (not shown) and acknowledges measured values of received intensity from the base station device 16. The second acquisition unit 32 also acquires location information on the reception point where the measured value of received intensity is measured. In other words, the second acquisition unit 32 defines the reception point associated with one of a plurality of theoretical values of received intensity acquired by the first acquisition unit 30 as a measurement point and acquires the measured value of received intensity at the measurement point thus defined. The measured value of received intensity at the measurement point is denoted by R[P].

Figure 3:
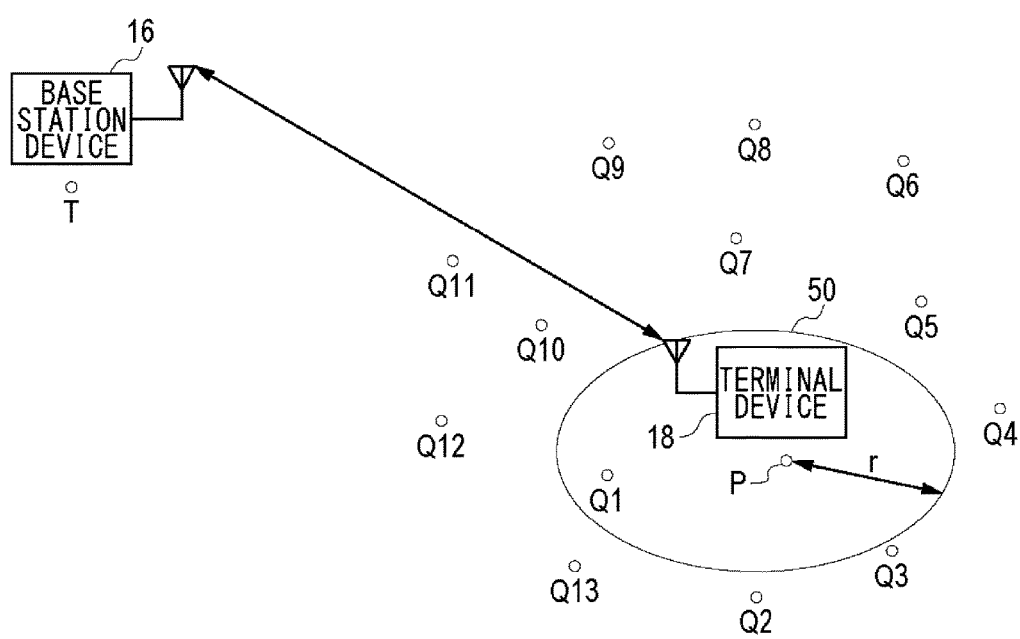
FIG. 3 shows an outline of the process in the determination unit of FIG. 2.

The determination unit 34 calculates a difference between the measured value R[P] of received intensity acquired by the second acquisition unit 32 and the theoretical value S[P] of received intensity at the measurement point acquired by the first acquisition unit 30 (e.g., an absolute value difference (|S[P]−R[P]|)). If the difference between the theoretical value and the measured value is large, it is likely that the impact from local factors (e.g., buildings of special shapes, occurrence of local noise, etc.) is large. The determination unit 34 corrects the theoretical value of received intensity by determining the size of a variable correction range in accordance with the difference between the theoretical value and measured value of received intensity in order to reduce the local impact. FIG. 3 shows an outline of the process in the determination unit 34. The base station device 16, the terminal device 18, transmission point, reception point, measurement point are shown similarly as in FIG. 1. In FIG. 3, the circular area with a radius r around the measurement point "P" where the terminal device 18 is located is shown as a correction range 50. As mentioned before, the size of the correction range 50 is determined by the determination unit 34.

Figure 4:
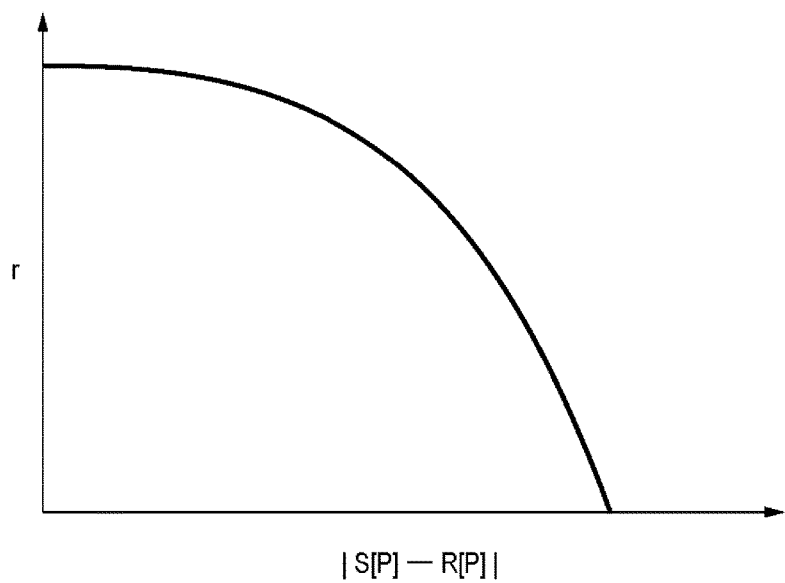
FIG. 4 shows a relationship maintained in the determination unit of FIG. 2 between the difference and the correction range.

FIG. 4 shows a relationship maintained in the determination unit 34 between the difference and the correction range. The horizontal axis represents an absolute difference (|S[P]−R[P]|) and the vertical axis represents the radius r of the correction range 50. As shown in the figure, the smaller the value (|S[P]−R[P]|), the larger the radius r. If the difference is small, it is considered that the impact from local factors is small so that a correction range 50 is defined. Meanwhile, the larger the value (|S[P]−R[P]|), the smaller the radius r. If the difference large, it is considered that the impact from local factors is large so that a small correction range 50 is defined. Reference is made back to FIG. 2. In determining the size of the correction range 50, the determination unit 34 refers to the relationship shown in FIG. 4 and determines the radius r of the correction range 50 such that the smaller the difference, the larger the correction range 50. The theoretical values of received intensity at the reception points included in the correction range 50 are subject to correction. In the case that the measured value is smaller than the theoretical value, the impact from shadowing loss due to buildings or from interference from radio waves originated from other radio devices is large. Meanwhile, in the case that the measured value is larger than the theoretical value, shadowing loss due to buildings is small.

The correction unit 36 corrects the theoretical value of received intensity at the reception points included in the correction range 50 determined by the determination unit 34 based on the measured value of received intensity acquired by the second acquisition unit 32. To explain it more specifically, a received intensity E[x] at a reception point x in the correction range 50 with a radius r around a measurement point P is given by expression (1). The received intensity E[x] represents a result of correction of the theoretical value of received intensity.

$$E[x]=k1[x]\times S[x]+k2[x]\times R(P) \quad (1)$$

In expression (1), k1[x] and k2[x] are coefficients determined by the reception point x and satisfy the condition of expression (2).

$$k1[x]+k2[x]=1 \quad (2)$$

The coefficient k2[x] monotonically decreases in value as the distance between the measurement point P and the reception point x grows and is represented by, for example, an exponential function.

If k1[x]=1 and k2[x]=0 in expressions (1) and (2), it means that only the theoretical value is used. In this case, the information on the measured value R[P] is not considered at all. The correction unit 36 corrects the received intensity at the respective reception points within the radius r from the measurement point P such that the closer to the measurement point P, the larger the impact from the measured value R[P], and, the farther from the measurement point P, the larger the impact from the theoretical value S[x]. Correction like this prevents an abrupt change in the received intensity in the case of a relatively small number of measurement points and enables for creating a highly precise radio wave condition map with smooth changes.

The geographical information data/radio wave condition synthesis unit 26 creates a radio wave condition map by superimposing the received intensity acquired by the radio wave condition calculation unit 22 on the geographical information data acquired by the geographical information data acquisition unit 20. The received intensity superimposed on the geographical information data represents the theoretical value of received intensity or the result of correction of the theoretical value of received intensity. The geographical information data/radio wave condition synthesis unit 26 outputs the radio wave condition map thus generated to a screen display device (not shown).

The features of the received intensity calculation device 10 are implemented in hardware such as a CPU, a memory, or other LSI's of an arbitrary computer, and in software such as a program loaded into a memory, etc. The figure depicts functional blocks implemented by the cooperation of these elements. Therefore, it will be obvious to those skilled in the art that the functional blocks may be implemented in a variety of manners by hardware only, by software only, or by a combination of hardware and software.

Figure 5:
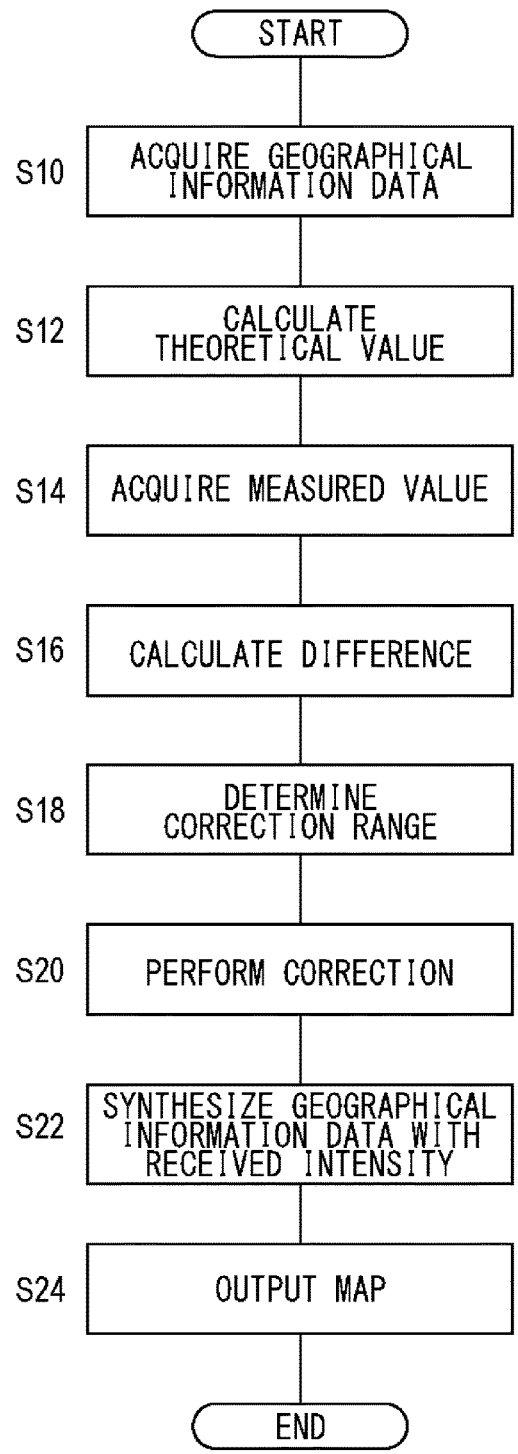
FIG. 5 is a flowchart showing the steps of outputting a map performed by the received intensity calculation device of FIG. 2.

A description will now be given of the operation of the received intensity calculation device 10 with the above-described configuration. FIG. 5 is a flowchart showing the steps of outputting a map performed by the received intensity calculation device 10. The geographical information data acquisition unit 20 acquires geographical information data (S10). The first acquisition unit 30 calculates a theoretical value (S12). The second acquisition unit 32 acquires a measured value (S14). The determination unit 34 calculates a difference (S16) and determines a correction range (S18). The correction unit 36 performs correction (S20). The geographical information data/radio wave condition synthesis unit 26 synthesizes the geographical information data and the received intensity (S22) and outputs a map (S24).

According to this embodiment, the theoretical value is corrected based on the measured value so that the precision of calculation of a received intensity is improved. In the absence of a measured value, the theoretical value is used. Therefore, a radio wave condition may can be created in a way that the cost of measurement is prevented from increasing. A highly precise radio wave condition map can be created efficiently from a small number of measured values. The number of terminal devices required to create a radio wave condition map is reduced so that the cost is reduced. The correction range is determined such that the smaller the difference between the measured value and the theoretical value, the larger the correction range. Therefore, the received intensity can be acquired by allowing for the precision of measured value. The theoretical value is corrected such that the smaller the distance from the measurement point to the reception point, the larger the impact from the measured value of received intensity. Therefore, the theoretical value is corrected properly for each point on the map so that the precision of calculation of received intensity is improved.

(Embodiment 2)

A description will be given of Embodiment 2. Like Embodiment 1, Embodiment 2 relates to collecting measured values of radio wave conditions from terminal devices that are actually put into operation and efficiently creating a highly precise radio wave condition map by effectively utilizing theoretical values of received intensity calculated by using a theoretical mode and a limited number of measured values. Like Embodiment 1, Embodiment 2 also involves adjusting the size of a correction range. Embodiment 2 relates to a process performed when two measurement points are located in close proximity to each other so that correction ranges thereof overlap. The communication system 100 and the received intensity calculation device 10 according to Embodiment 2 are similarly configured as those of FIGS. 1 and 2. The following description concerns a difference.

Figure 6:
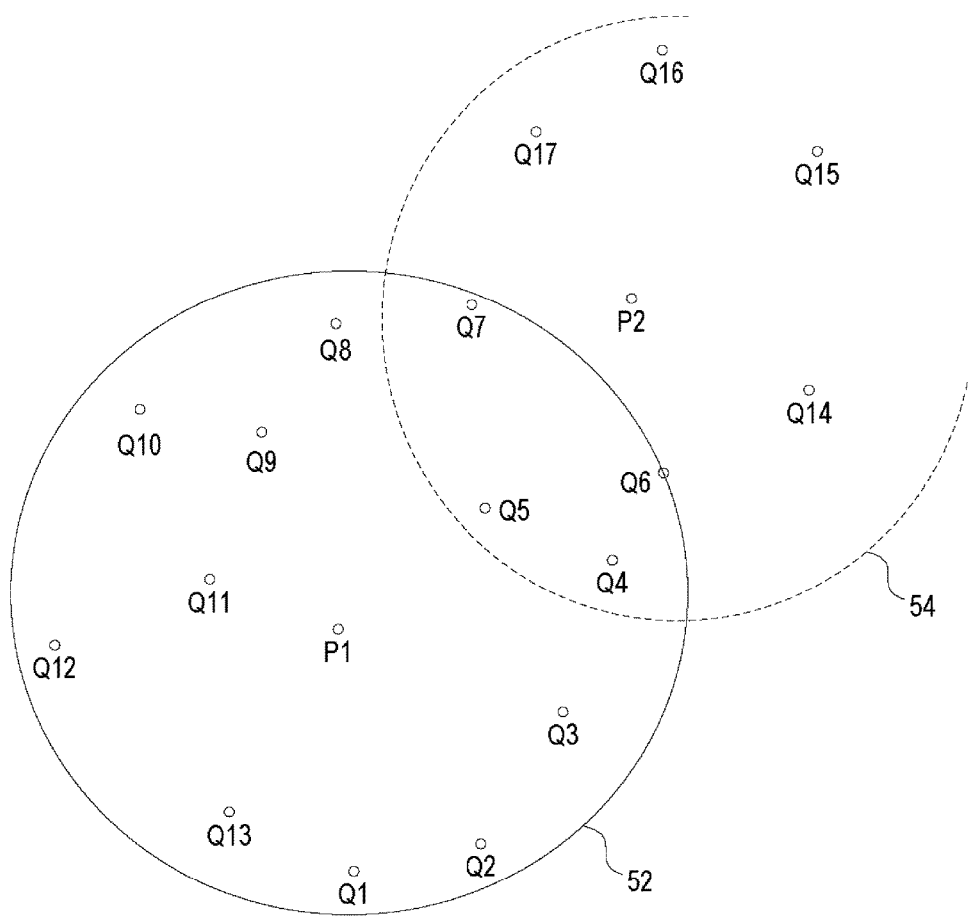
FIG. 6 shows an outline of the process of acquiring a received intensity according to Embodiment 2.

FIG. 6 shows an outline of the process of acquiring a received intensity according to Embodiment 2. The figure only shows measurement points and reception points in FIGS. 1 and 3. A first measurement point "P1" and a second measurement point "P2" are shown. A plurality of reception points "Q1~Q17" are shown around these measurement points.

The second acquisition unit 32 of FIG. 2 acquires a first measured value of received intensity at the first measurement point "P1" and a second measured value of received intensity at the second measurement point "P2" different from the first measurement point "P1." The determination unit 34 determines the size of a first correction range 52 shown in FIG. 6 based on a theoretical value S[P1] of received intensity and a first measured value R[P1] of received intensity. The correction unit 36 calculates a corrected value E[x] of the theoretical value of received intensity at a reception point included in the first correction range 52 determined by the determination unit 34 based on the theoretical value S[x] of received intensity and the first measured value R[P1] of received intensity.

Following this, the determination unit 34 determines the size of a second correction range 54 shown in FIG. 6 based on a theoretical value S[P2] of received intensity and a second measured value R[P2] of received intensity. The correction unit 36 calculates a corrected value E[x] of the theoretical value of received intensity at a reception point included in the second correction range 54 determined by the determination unit 34 based on the theoretical value S[x] of received intensity and the second measured value R[P2] of received intensity. It should be noted that, for reception points Q4, Q5, Q6, and Q7 in an area in which the first correction range 52 and the second correction range 54 overlap, corrected values E[Q4], E[Q5], E[Q6], and E[Q7] of theoretical values of received intensity calculated in the first correction range 52 are applied in place of theoretical values S[Q4], S[Q5], S[Q6] and S[Q7]. For calculation of corrected values of theoretical values in the second correction range 54, the corrected values E[Q4], E[Q5], E[Q6], and E[Q7] of the theoretical values are used in expression (1) in place of S[x]. This ensures that the corrected values of theoretical values at the reception points Q4, Q5, Q6, and Q7 in the area in which the first correction range 52 and the second correction range 54 overlap are further corrected. Expressions (1) and (2) are also used for these calculations.

Figure 7:
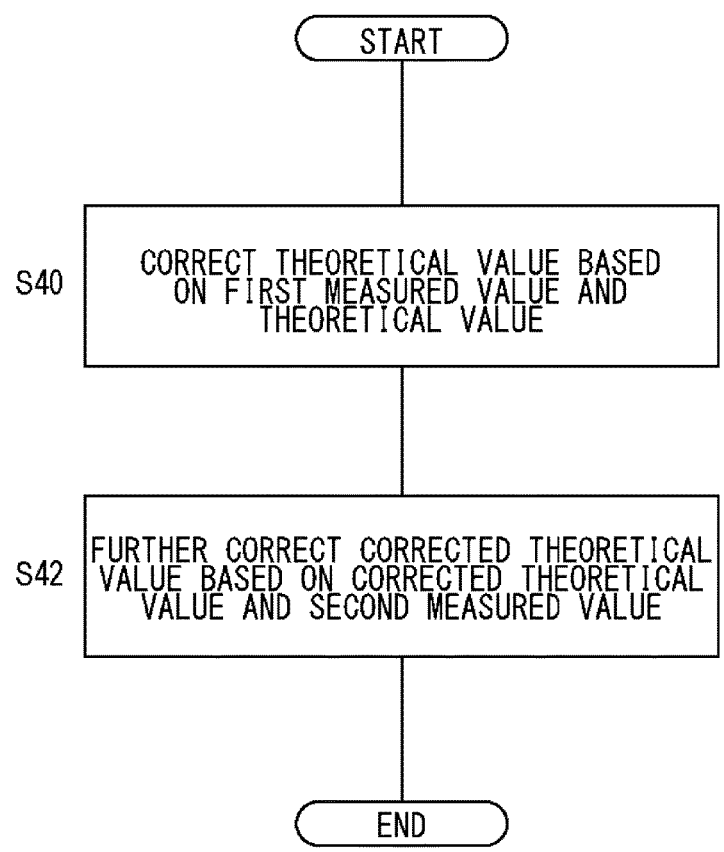
FIG. 7 is a flowchart showing the steps of correction by the received intensity calculation device according to Embodiment 2.

FIG. 7 is a flowchart showing the steps of correction by the received intensity calculation device 10 according to Embodiment 2. The determination unit 34 and the correction unit 36 correct the theoretical value based on the first measured value and the theoretical value (S40). The determination unit 34 and the correction unit 36 further correct the corrected theoretical value based on the corrected theoretical value and the second measured value (S42). A similar process may be performed if three or more measured values are available and the correction ranges thereof overlap.

According to this embodiment, the theoretical value is corrected according to the first measured value and the corrected theoretical value is further corrected according to the second measured value. This ensures that the first measured value and the second measured value are reflected in the theoretical value in the case that the two measurement points are located in close proximity to each other. Since two measured values are used, the precision of received intensity is improved.

(Embodiment 3)

A description will be given of Embodiment 3. Like foregoing embodiments, Embodiment 3 relates to correcting the theoretical value of received intensity based on the measured value of received intensity. In the foregoing embodiments, the theoretical value of received intensity at a reception point included in a correction range is corrected based on the measured value of received intensity at a measurement point. Meanwhile, the theoretical value of received intensity at a point (target point) for which the received intensity is calculated is corrected based on measured values of received intensity at a plurality of measurement points located in the neighborhood of the target point. In this process, correction is made such that the impact from the measured value varies depending on the number of measured values in order to improve the precision of correction.

Figure 8:
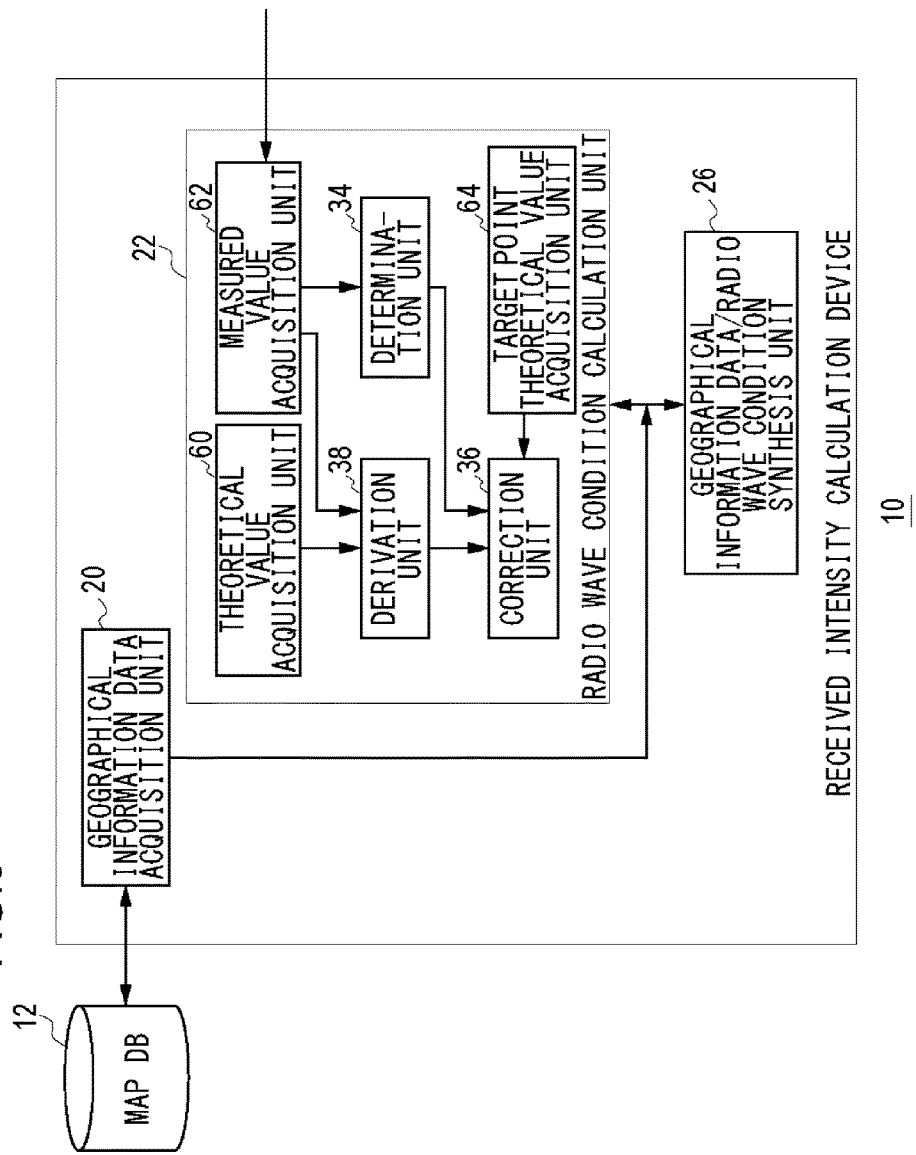
FIG. 8 shows a configuration of the received intensity calculation device according to Embodiment 3.

FIG. 8 shows a configuration of the received intensity calculation device 10 according to Embodiment 3. The received intensity calculation device 10 includes a geographical information data acquisition unit 20, a radio wave condition calculation unit 22, a geographical information data/radio wave condition synthesis unit 26. The radio wave condition calculation unit 22 includes a theoretical value acquisition unit 60, a measured value acquisition unit 62, a determination unit 34, a correction unit 36, a derivation unit 38, and a target point theoretical value acquisition unit 64.

The measured value acquisition unit 62 acquires measured values of received intensity of radio waves transmitted from the transmission point and received at a plurality of measurement points. The theoretical value acquisition unit 60 acquires the theoretical values of received intensity at the reception points associated with the plurality of measured values of received intensity acquired by the theoretical value acquisition unit 60. It is assumed that the theoretical values at the measurement points can be acquired without exception.

Figure 9:
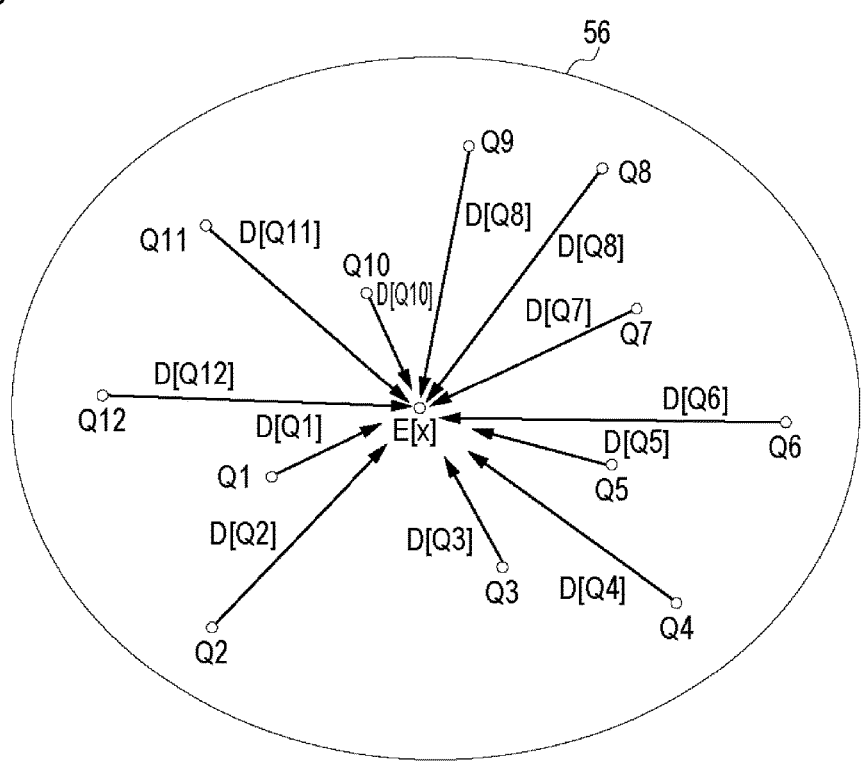
FIG. 9 shows an outline of the process of acquiring a received intensity performed by the received intensity calculation device of FIG. 8.

FIG. 9 shows an outline of the process of acquiring a received intensity performed by the received intensity calculation device 10. The point for which the theoretical value is corrected is denoted by "target point" x. The target point x may be a measurement point. In the following description, however, it is assumed that the target point x is not a measurement point and a measured value of received intensity is not acquired at the target point x. Subsequently, measurement points in the neighborhood of the target point x where measured values are obtained are identified. For example, measurement points in a range in which the distance from the target point x is not more than a predetermined value are identified. In FIG. 9, the range in which the distance from the target point x is not more than a predetermined value is indicated by a calculation range 56. The measurement points included in the calculation range 56 are indicated by Q1~Q12. If the number of measurement points included in the calculation range 56 is large, N measurement points may be selected in the ascending order of distance from the target point x and the other measurement points may be omitted. For the purpose of generalization, QN for the N-th measurement point, is used in place of Q12. The theoretical values at the measurement points Q1~QN are indicated by S[Q1]~S[QN] and the measured values are indicated by R[Q1]~R[QN]. The distances from the target point x to the points Q1~QN are denoted by D[Q1]~D[QN]. Reference is made back to FIG. 8.

The derivation unit 38 derives differences Δ[Q1]~Δ[QN] between the measured value of received intensity and the theoretical value of received intensity, based on the plurality of measured values R[Q1]~R[QN] of received intensity acquired by the measured value acquisition unit 62 and the plurality of theoretical values of received value S[Q1]~S[QN] acquired by the theoretical value acquisition unit 60. For example, Δ[Q1]=R[Q1]−S[Q1].

Figure 10:
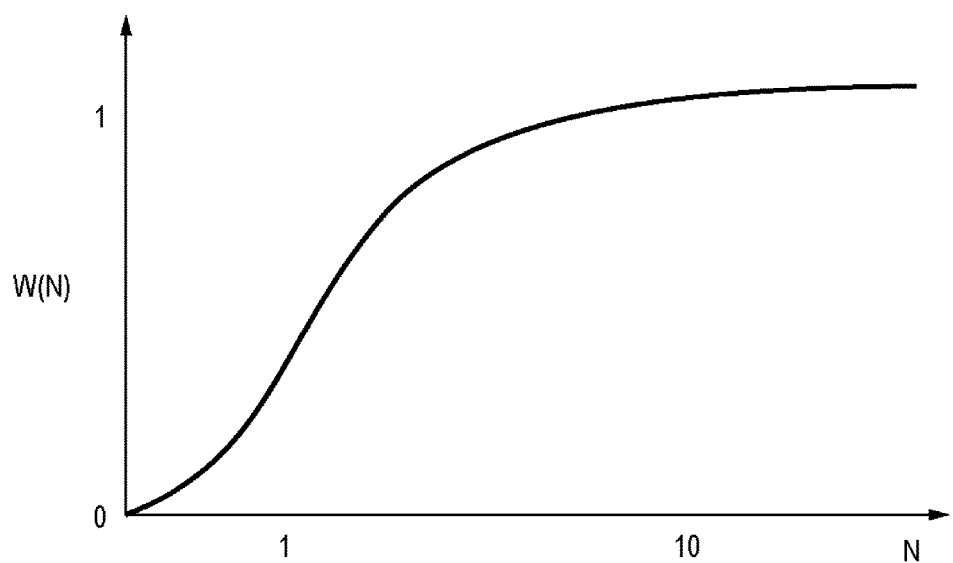
FIG. 10 shows a relationship between the number of measurement points and the coefficient W(N) maintained in the determination unit of FIG. 8.

The determination unit 34 determines a coefficient W(N) in accordance with the number of measured values of received intensity acquired by the measured value acquisition unit 62, i.e., the number of measurement points included in the calculation range 56 of FIG. 9. It is noted that W(N) is a function receiving the number N of measurement points as an input. FIG. 10 shows a relationship between the number of measurement points and the coefficient W(N) maintained in the determination unit 34. The horizontal axis represents the number N of measurement points and the vertical axis represents the coefficient W(N). For example, the profile of the coefficient W(N) is such that the smaller the number N, the smaller the output, and the larger the number N, the larger the output. In this case, the output value of the coefficient W(N) is in the range 0-1. The minimum value of the coefficient W(N) may be a value larger than 0 instead of 0, and the maximum value of the coefficient W(N) may be a value larger than 1. Reference is back to FIG. 8.

The target point theoretical value acquisition unit 64 acquires a theoretical value of received value at the target point x. The theoretical value of received intensity at the target point is indicated by S[x]. It is assumed that a measured value of received intensity is not acquired at the target point.

The correction unit 36 corrects the theoretical value S[x] of received intensity acquired by the target point theoretical value acquisition unit 64, based on the differences Δ[Q1]−Δ[QN] for the measurement points derived in the derivation unit 38. The correction represents calculating the received intensity (corrected value) E[x] at the target point x based on expression (3).

$$E[x] = S[x] + W(N) \times \frac{1}{N} \sum_{i=1}^{N} \alpha[i] \times \Delta[Qi] \qquad (3)$$

where α[i](i=1~N) denotes a coefficient determined by the distance D[Qi] from the target point x to the measurement point Qi. The coefficient monotonically decreases such that the larger the distance D[Qi], the smaller the coefficient α[i]. By correcting the theoretical value S[x] in this way, it is ensured that the closer the target point x to the measurement point Qi, the larger the impact from the measured value. This translates into greater impact from the difference. Meanwhile, the farther the target point x from the measurement point Qi, the larger the impact from the theoretical value. One Qk of the measurement points Qi(i=1~N) may be identical to the target point x. In this case, D[Qk]=0 so that a[k] assumes the maximum value. For this reason, the impact from Qk is larger than at the other measurement points Qj(j=1~N, j≠k). The received intensity (corrected value) E[x] is calculated by reflecting the measured value at Qj as well as the measured value at Qk.

By including the term W(N), it is ensured that, if the number of measured values is small (e.g., N=1), the received intensity (corrected value) E[x] affected more by the theoretical value than by the measured value is calculated because W(N) is small. Therefore, the corrected value will be close to the theoretical value S[x] at the target point x. Meanwhile, if the number of measured values is large (e.g., N=10), the received intensity (corrected value) E[x] affected more by the measured value than by the theoretical value is calculated because W(N) is large. In other words, the impact from the difference is adjusted according to the coefficient W(N) corresponding to the number N of measurement points located in the neighborhood of the target point x where correction of the theoretical value is performed. It is noted that each measured value includes a measurement error and a local factor. In the case that N is large, it is possible to cancel out (average) errors in measured values so that the impact from the measured value is ensured to be large.

FIGS. 11A-11B show corrected values calculated by the correction unit 36. FIG. 11A shows a case in which the number N of measured values is small, and FIG. 11B shows a case where the number N of measured values is large. Referring to FIGS. 11A-11B, C1 and C3 denotes corrected values derived without using W(N) and by fixing W(N) such that W(N)=1 in expression (3). In this state, the theoretical value TH is corrected irrespective of the number of measured values. C2 denotes a corrected value derived according to expression (3) when the number N of measured values is small. The graph shows that C2 is close to the theoretical value TH. C4 denotes a corrected value derived according to expression (3) when the number N of measured values is large. The graph shows that C4 is considerably larger than the threshold value TH.

Figure 12:
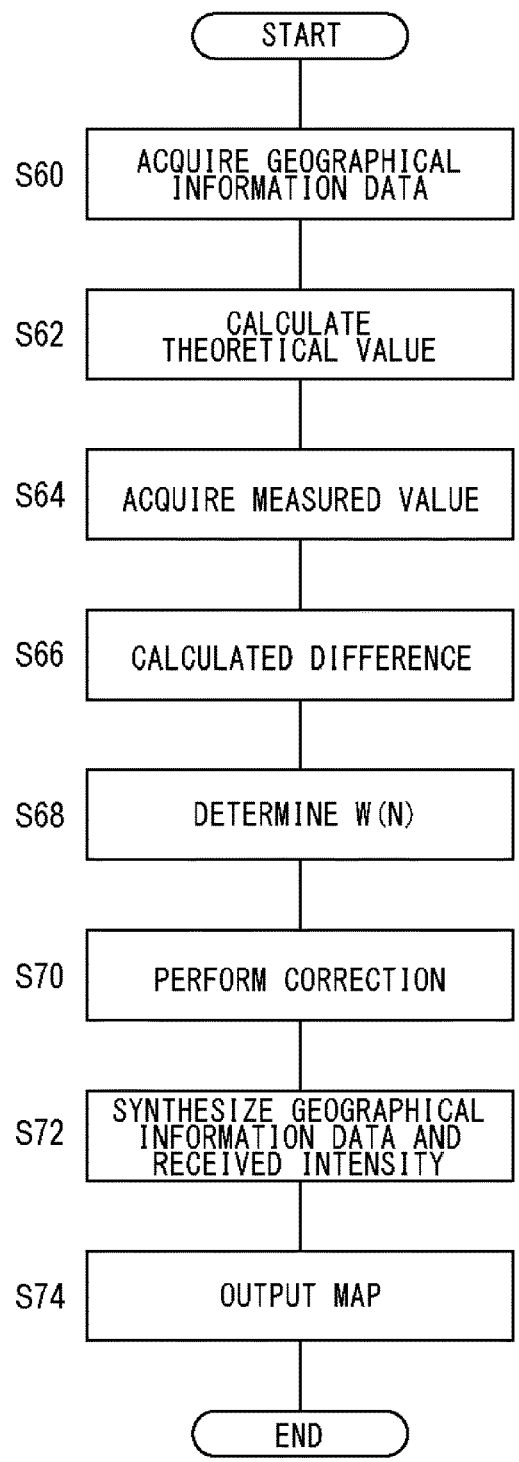
FIG. 12 is a flowchart showing the steps of outputting a map performed by the received intensity calculation device of FIG. 8.

FIG. 12 is a flowchart showing the steps of outputting a map performed by the received intensity calculation device 10. The geographical information data acquisition unit 20 acquires geographical information data (S60). The theoretical value acquisition unit 60 calculates a theoretical value (S62). The measured value acquisition unit 62 acquires a measured value (S64). The derivation unit 38 calculates a difference (S66). The determination unit 34 determines W(N) (S68). The correction unit 36 performs correction (S70). The geographical information data/radio wave condition synthesis unit 26 synthesizes the geographical information data and the received intensity (S72) and outputs a map (S74).

According to this embodiment, a plurality of measured values are used to calculate the received intensity at a target point so that the precision of received intensity is improved. In the case that the number of measured values is small, the corrected value is calculated without increasing the impact from the measured value so much. Therefore, the impact from an error included in the measured value is reduced. In the case that the number of is large, the variation in measured values is canceled out (average). Since the variation in measured values is canceled out, local factors can be canceled out. Since the theoretical value is corrected smoothly, a highly precise radio wave condition map can be created.

(Embodiment 4)

A description will now be given of Embodiment 4. Like the foregoing embodiments, embodiment 4 relates to correcting the theoretical value of received intensity based on the measured value of received intensity. Like Embodiment 3, Embodiment 4 involves correcting the theoretical value of received intensity at a target point for which the theoretical value is corrected, based on measured values of received intensity at a plurality of measurement points located in the neighborhood of the target point. In this process, correction is made such that the impact from the measured value is varied in accordance with the degree of variation in measured values found in the neighborhood of the target point x in order to improve the precision of correction.

Figure 13:
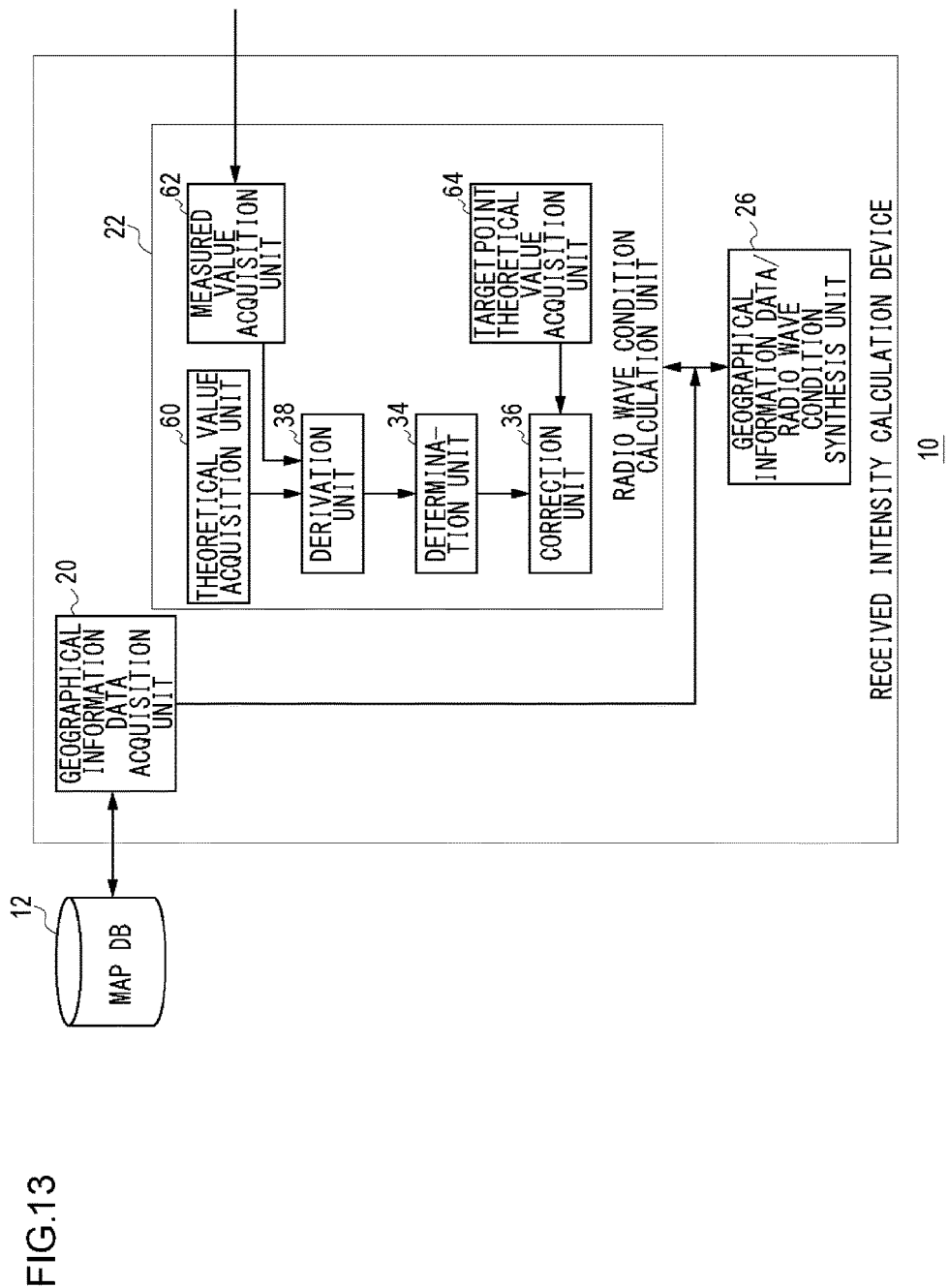
FIG. 13 shows a configuration of the received intensity calculation device according to Embodiment 4.

FIG. 13 shows a configuration of the received intensity calculation device 10 according to Embodiment 4. The components included in the received intensity calculation device 10 are similar to those of FIG. 8 except that they differ in part in terms of connections and functions. The theoretical value acquisition unit 60, the measured value acquisition unit 62, and the derivation unit 38 perform a process similar to that of FIG. 8. The determination unit 34 calculates an indicator V indicating the degree of variation in the differences Δ[Q1]~Δ[QN] at respective measurement points derived in the derivation unit 38. A numerical value like a dispersion (sample variance, unbiased variance), standard deviation, average deviation, difference between the third quartile deviation and the first quartile deviation can be used as the indicator V. If a dispersion is used as the indicator V, the indicator is calculated according to expression (4). Δm denotes an average value of N differences.

$$V = \frac{1}{N}\sum_{i=1}^{N}(\Delta[Qi] - \Delta m)^2 \quad (4)$$

Figure 14:
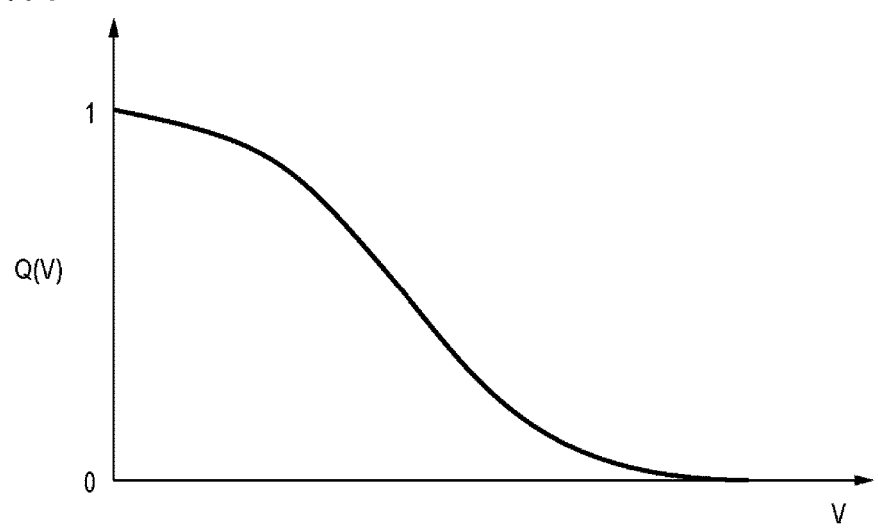
FIG. 14 shows a relationship between the degree of variation and Q(V) maintained in the determination unit of FIG. 13.

The determination unit 34 determines a coefficient Q(V) according to the indicator V. Q(V) is a function receiving the indicator V as an input. FIG. 14 shows a relationship between the degree of variation and Q(V) maintained in the determination unit 34. The horizontal axis represents the indicator V indicating the degree of variation, and the vertical axis represents the coefficient Q(V). For example, the profile of the coefficient Q(V) is such that the smaller the indicator V, the larger the output, and the larger the indicator V, the smaller the output. In this case, the output value of the coefficient Q(V) is in the range 0-1. The minimum value of the coefficient Q(V) may be a value larger than 0 instead of 0, and the maximum value of the coefficient Q(V) may be a value larger than 1. Reference is back to FIG. 13.

The correction unit 36 corrects the theoretical value S[x] of received intensity acquired by the target point theoretical value acquisition unit 64, based on the differences Δ[Q1]~Δ[QN] for the measurement points derived in the derivation unit 38. The correction represents calculating the received intensity (corrected value) E[x] at the target point x based on expression (5).

$$E[x] = S[x] + Q(V) \times \frac{1}{N}\sum_{i=1}^{N}\alpha[i] \times \Delta[Qi] \quad (5)$$

By including the term Q(V), it is ensured that, if the degree of variation in the differences Δ[Qi] at the respective measurement points is large, the received intensity (corrected value) E[x] affected more by the theoretical value than by the measured value is calculated because Q(V) is small. Therefore, the corrected value will be close to the theoretical value S[x] at the target point x. Meanwhile, if the degree of variation in the differences Δ[Qi] at the respective measurement points is small, Q(v) is large, which is reflected in the received intensity (corrected value) E[x] affected more by the measured value than by the theoretical value.

Figure 15B:
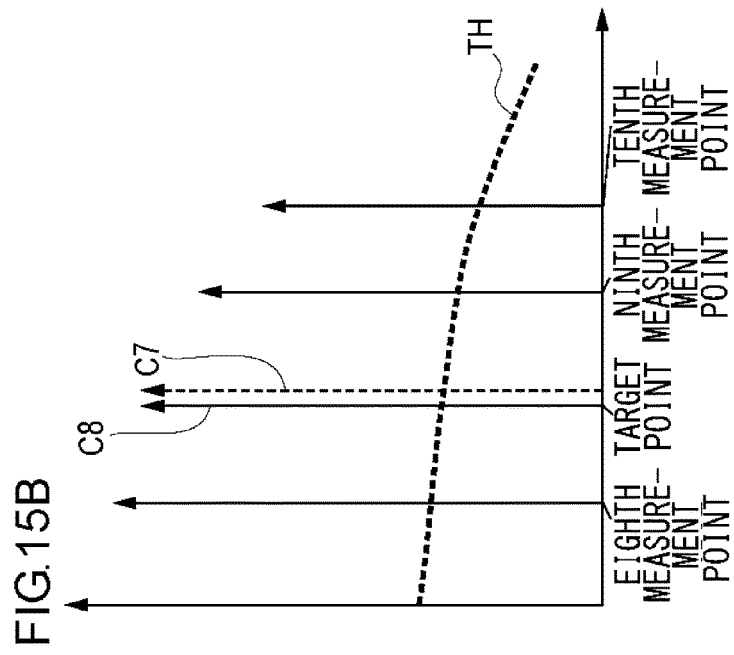
FIGS. 15A-15B show corrected values calculated by the correction unit of FIG. 13.
Figure 15A:
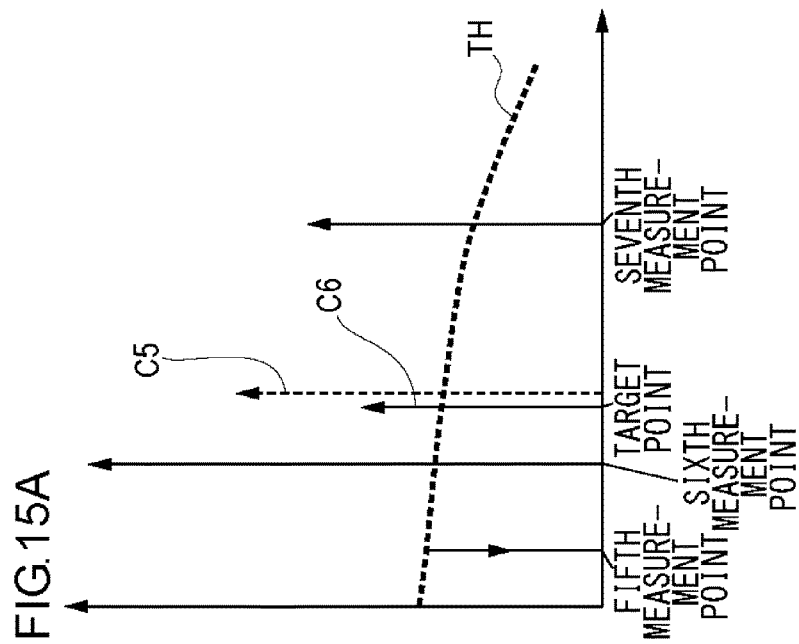

FIGS. 15A-15B show corrected values calculated by the correction unit 36. FIG. 15A shows a case in which the degree of variation in the differences Δ[Qi] is large, and FIG. 15B shows a case where the degree is small. Referring to FIGS. 15A-15B, C5 and C7 denote corrected values derived without using Q(V) and by fixing Q(V) such that Q(V)=1 in expression (5). In this state, the theoretical value TH is corrected irrespective of the number of measured values. C6 denotes a corrected value derived according to expression (5) when the degree of variation is large. The graph shows that C6 is close to the theoretical value TH. C8 denotes a corrected value derived according to expression (5) when the degree of variation is small. The graph shows that C8 is considerably larger than the threshold value TH.

In other words, the impact from the difference is adjusted according to the coefficient Q(V) corresponding to the degree of variation in measured values in the neighborhood of the target point x where correction of the theoretical value is performed. It is noted that, if the variation in measured values is large, it is considered that the measured value affected heavily by a measurement error and a local factor. It is therefore desirable not to change the theoretical value radically. In the case that the variation is small, it is considered that the measured value is less affected by a measurement error or a local factor so that the theoretical value may be modified radically.

Figure 16:
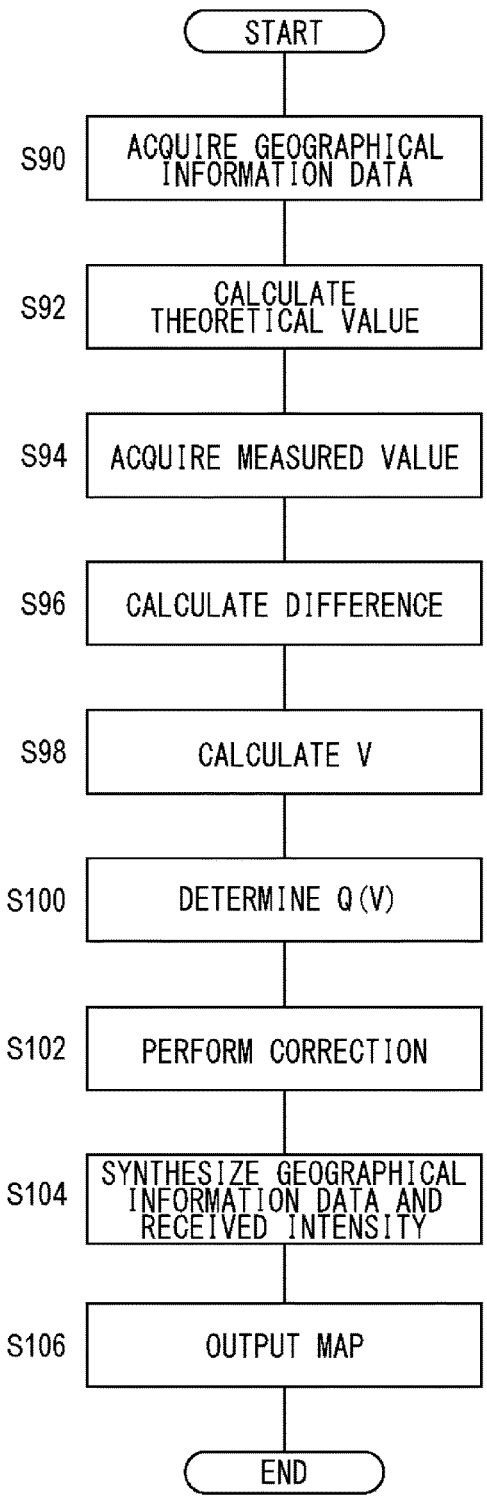
FIG. 16 is a flowchart showing the steps of outputting a map performed by the received intensity calculation device of FIG. 13.

FIG. 16 is a flowchart showing the steps of outputting a map performed by the received intensity calculation device 10. The geographical information data acquisition unit 20 acquires geographical information data (S90). The theoretical value acquisition unit 60 calculates a theoretical value (S92). The measured value acquisition unit 62 acquires a measured value (S94). The derivation unit 38 calculates a difference (S96). The determination unit 34 determines V (S98) and Q(V) (S100). The correction unit 36 performs correction (S102). The geographical information data/radio wave condition synthesis unit 26 synthesizes the geographical information data and the received intensity (S104) and outputs a map (S106).

According to this embodiment, the corrected value is calculated without increasing the impact from the measured value so much in the case that the degree of variation in differences between the measured value and the theoretical value is large. Therefore, the impact from a measurement error and/or local factor can be reduced. Correction is performed such that the impact from the measured value is increased if the degree of variation is small. Therefore, the precision of received intensity can be improved. Since the theoretical value is corrected smoothly irrespective of the degree of variation, a highly precise radio wave condition map can be created.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In Embodiment 4, the degree of variation in differences Δ[Qi](i=1~N) between the measured value and the theoretical value is calculated. Alternatively, the degree of variation in measured values R[Qi](i=1~N) may be calculated and used as the indicator V in case that the area in the neighborhood of the target point is small or it is considered that the theoretical value is substantially uniform in the neighborhood area. According to this variation, the flexibility of configuration can be improved.

What is claimed is:

1. A non-transitory computer-readable recording medium having embedded thereon a program for received intensity calculation, the program comprising computer-implemented modules of:
    a first acquisition module that acquires theoretical values of received intensity of radio waves from a transmission point received at a plurality of reception points;
    a second acquisition module that defines a reception point associated with one of a plurality of theoretical values of received intensity acquired by the first acquisition module as a measurement point and acquires a measured value of received intensity at the measurement point thus defined; and
    a determination module that determines a correction range in accordance with a difference between the measured value of received intensity acquired by the second acquisition module and the theoretical value of received intensity at the measurement point acquired by the first acquisition module;
    a correction module that corrects the theoretical value of received intensity at the reception point included in the correction range determined by the determination module, based on the measured value of received intensity acquired by the second acquisition module; wherein:
        the second acquisition module acquires a first measured value of received intensity at a first measurement point and a second measured value of received intensity at a second measurement point different from the first measurement point, and
        the determination module and the correction module process the theoretical value of received intensity and the first measured value of received intensity and then process the theoretical value of received intensity corrected by the first measured value of received intensity and the second measured value of received intensity.

2. The non-transitory computer-readable recording medium according to claim 1, wherein
    the determination module determines the correction range such that the smaller the difference, the larger the correction range.

3. The non-transitory computer-readable recording medium according to claim 1, wherein
    the correction module corrects the theoretical value of received intensity such that the smaller the distance from the measurement point to the reception point, the larger the impact from the measured value of received intensity.

4. The non-transitory computer-readable recording medium according to claim 1, wherein
    the correction module corrects the theoretical value of received intensity by using a weighted sum of the theoretical value of received intensity acquired by the first acquisition module and the measured value of received intensity acquired by the second acquisition module.

5. The non-transitory computer-readable recording medium according to claim 1, wherein
    the determination module determines a distance used for correction in accordance with the difference and defines a range within the distance from the measurement point as the correction range.

6. The non-transitory computer-readable recording medium according to claim 1, wherein the determination module determines a distance used for correction in accordance with the difference and defines a range within the distance from the measurement point as the correction range, and ensures that the smaller the difference, the larger the distance.

7. A non-transitory computer-readable recording medium having embedded thereon a program for received intensity calculation, the program comprising computer-implemented modules of:
- a first acquisition module that acquires theoretical values of received intensity of radio waves from a transmission point received at a plurality of reception points;
- a second acquisition module that defines a reception point associated with one of a plurality of theoretical values of received intensity acquired by the first acquisition module as a measurement point and acquires a measured value of received intensity at the measurement point thus defined;
- a determination module that determines a correction range in accordance with a difference between the measured value of received intensity acquired by the second acquisition module and the theoretical value of received intensity at the measurement point acquired by the first acquisition module; and
- a correction module that corrects the theoretical value of received intensity at the reception point included in the correction range determined by the determination module, based on the measured value of received intensity acquired by the second acquisition module;
- wherein the correction module corrects the theoretical value of received intensity such that the smaller the distance from the measurement point to the reception point, the larger the impact from the measured value of received intensity, and
- wherein the correction module corrects the theoretical value of received intensity by using a weighted sum of the theoretical value of received intensity acquired by the first acquisition module and the measured value of received intensity acquired by the second acquisition module, and ensures that the smaller the distance from the measurement point to the reception point, the larger a weight coefficient for the measured value of received intensity.

8. The non-transitory computer-readable recording medium according to claim 7, wherein
the determination module determines the correction range such that the smaller the difference, the larger the correction range.

9. A non-transitory computer-readable recording medium having embedded thereon a program for received intensity calculation, the program comprising computer-implemented modules of:
- a first acquisition module that acquires theoretical values of received intensity of radio waves from a transmission point received at a plurality of reception points;
- a second acquisition module that defines a reception point associated with one of a plurality of theoretical values of received intensity acquired by the first acquisition module as a measurement point and acquires a measured value of received intensity at the measurement point thus defined;
- a determination module that determines a correction range in accordance with a difference between the measured value of received intensity acquired by the second acquisition module and the theoretical value of received intensity at the measurement point acquired by the first acquisition module; and
- a correction module that corrects the theoretical value of received intensity at the reception point included in the correction range determined by the determination module, based on the measured value of received intensity acquired by the second acquisition module;
- wherein the determination module determines the correction range such that the smaller the difference, the larger the correction range, and
- wherein the determination module determines a distance used for correction in accordance with the difference and defines a range within the distance from the measurement point as the correction range, and ensures that the smaller the difference, the larger the distance.

10. The non-transitory computer-readable recording medium according to claim 9, wherein
the correction module corrects the theoretical value of received intensity such that the smaller the distance from the measurement point to the reception point, the larger the impact from the measured value of received intensity.

11. The non-transitory computer-readable recording medium according to claim 9, wherein
the correction module corrects the theoretical value of received intensity by using a weighted sum of the theoretical value of received intensity acquired by the first acquisition module and the measured value of received intensity acquired by the second acquisition module.

12. The non-transitory computer-readable recording medium according to claim 7, wherein
the determination module determines a distance used for correction in accordance with the difference and defines a range within the distance from the measurement point as the correction range.

13. The non-transitory computer-readable recording medium according to claim 7, wherein
the determination module determines a distance used for correction in accordance with the difference and defines a range within the distance from the measurement point as the correction range, and ensures that the smaller the difference, the larger the distance.

* * * * *